US009657879B1

(12) United States Patent
Currey

(10) Patent No.: US 9,657,879 B1
(45) Date of Patent: May 23, 2017

(54) TUBE CONNECTION ASSEMBLY

(71) Applicant: Mercury Plastics, Inc., Middlefield, OH (US)

(72) Inventor: Donald Currey, Chagrin Falls, OH (US)

(73) Assignee: Mercury Plastics, Inc., Middlefield, OH (US)

( * ) Notice: Subject to any disclaimer, the term of this patent is extended or adjusted under 35 U.S.C. 154(b) by 441 days.

(21) Appl. No.: 14/204,434

(22) Filed: Mar. 11, 2014

Related U.S. Application Data

(60) Provisional application No. 61/787,720, filed on Mar. 15, 2013.

(51) Int. Cl.
*F16L 37/138* (2006.01)
(52) U.S. Cl.
CPC .................................. *F16L 37/138* (2013.01)
(58) Field of Classification Search
CPC ....... F16L 37/138; F16L 37/08; F16L 37/084; F16L 37/0847; F16L 37/10; F16L 37/101; F16L 37/103; F16L 37/1205; F16L 37/127; F16L 3/02; F16L 3/08; F16L 23/02; F16L 25/009; F16B 7/0426; F16B 7/22; F16B 7/04; F16B 7/0406; Y10T 403/551
See application file for complete search history.

(56) References Cited

U.S. PATENT DOCUMENTS

| 574,236 A | * | 12/1896 | Blackburn | F16L 21/022 285/109 |
| 770,982 A | * | 9/1904 | Plassmann | F16L 27/111 285/114 |
| 1,069,904 A | * | 8/1913 | Sanders | F16L 37/101 285/314 |
| 1,209,374 A | * | 12/1916 | Andreolli | F16L 37/252 285/106 |
| 1,966,718 A | * | 7/1934 | Hanson | F16L 37/10 285/313 |

(Continued)

FOREIGN PATENT DOCUMENTS

| DE | 2739990 A1 | * | 3/1979 | ............ F16B 7/0426 |
| DE | 102005053391 A1 | * | 5/2007 | ................ F16L 3/02 |

*Primary Examiner* — David E Sosnowski
*Assistant Examiner* — James A Linford
(74) *Attorney, Agent, or Firm* — Hahn Loeser & Parks, LLP

(57) ABSTRACT

A tube connection assembly includes a first connector along a connection axis having a first engagement surface transverse to the connection axis, and a second connector connected to a tube, the second connector having a second engagement surface transverse to the connection axis. The first connector and the second connector are engagable together joining the first and second connectors in a coupled state, the first engagement surface and the second engagement surface spaced a predetermined distance when in the coupled state. A fastener is provided positionable in a locked state and an unlocked state, the fastener in the unlocked state being slidable along the tube, and the fastener in the locked state retaining the first engagement surface and the second engagement surface. The fastener may include a pair of opposing retaining surfaces spaced at least the predetermined distance, at least one of the retaining surfaces having a lead-in.

20 Claims, 5 Drawing Sheets

(56) References Cited

U.S. PATENT DOCUMENTS

| | | | | |
|---|---|---|---|---|
| 4,631,056 A | * | 12/1986 | Dye | A61M 39/1011 285/3 |
| 2002/0071718 A1 | * | 6/2002 | Marty | F16L 37/1225 403/293 |
| 2010/0191193 A1 | * | 7/2010 | Pajunk | A61M 25/0014 604/250 |

* cited by examiner

TUBE CONNECTION ASSEMBLY

This application claims the benefit of U.S. Provisional Patent Application 61/787,720, filed Mar. 15, 2013.

BACKGROUND

Some appliance applications have a tube connected to a second part, where the second part may be a water source, a water dispensing apparatus, a filtering apparatus, another tube, or other part or assembly. For example, some refrigerator doors contain a water or ice dispenser that receives water by way of a tube through the hinge. In order to facilitate assembly and removal of the refrigerator door, a portion of the tube was installed in the door, and a waterway connector was placed near the hinge to enable the tube to be connected and disconnected from a tube from the water source.

In the past, various waterway connections were used, often press-fit into the end of a tube, and included features that locked or threaded together to make a connection. In many waterway applications, leak-proof connections were desired, and certain prior connections were developed to ensure a suitable seal. However, to provide a suitable seal, these prior connections were connected so securely that they were difficult to disconnect when service or disassembly was needed. Other prior connections were easy to disconnect, but enabled inadvertent loosening or separation and could not be used in applications where leak-proof connections were desired. Additionally, many such connections were disassembled by a consumer, for example to remove a refrigerator door to facilitate moving the appliance. Consumers found disassembly of the prior connections difficult, and frequently failed to reassemble the prior connections properly enabling leaks in the connections. Consumer disassembly of prior waterway connections resulted in increased repair calls and consumer dissatisfaction with the difficulty of proper disassembly and reassembly, increasing the costs associated with prior connections.

SUMMARY OF THE DISCLOSURE

What is disclosed is a tube connection assembly including a first connector along a connection axis having a first engagement surface transverse to the connection axis, and a second connector connected to a tube, the second connector having a second engagement surface transverse to the connection axis. The first connector and the second connector are engagable together joining the first and second connectors in a coupled state. The first engagement surface and the second engagement surface spaced a predetermined distance when in the coupled state. A fastener is provided positionable in a locked state and an unlocked state, the fastener in the unlocked state being slidable along the tube, and the fastener in the locked state retaining the first engagement surface and the second engagement surface.

Also disclosed is a tube connection assembly having a first connector along a connection axis having a first engagement surface transverse to the connection axis, and a second connector connected to a tube, the second connector having a second engagement surface transverse to the connection axis. The first connector and the second connector are engagable together joining the first and second connectors, the first engagement surface and the second engagement surface spaced a predetermined distance when in the coupled state. A fastener is provided positionable in a locked state and an unlocked state, the fastener having a pair of opposing retaining surfaces spaced at least the predetermined distance, at least one of the retaining surfaces including a lead-in surface, the fastener in the locked state retaining the first engagement surface and the second engagement surface.

DETAILED DESCRIPTION OF PARTICULAR EMBODIMENTS

The present tube connection assembly may be used for various applications in which one fluid component is connected to another fluid component, where a first connector is either a male fitting or a female fitting and a second connector is the other of the male fitting or the female fitting. In various applications, for example, the first component is connected in fluid communication to the first connector and the second component is connected in fluid communication to the second connector, so that the first and second connectors can be connected together in a male-female tube connection to join the first and second components. Whether the first connector is the male fitting or the female fitting may not matter for some applications, but for other applications, such as where the first fitting must fit in a space having a particular size or shape or other requirement, the first connector may specifically be selected to be the male fitting or the female fitting to satisfy various requirements of the particular application as desired.

Figure 1:
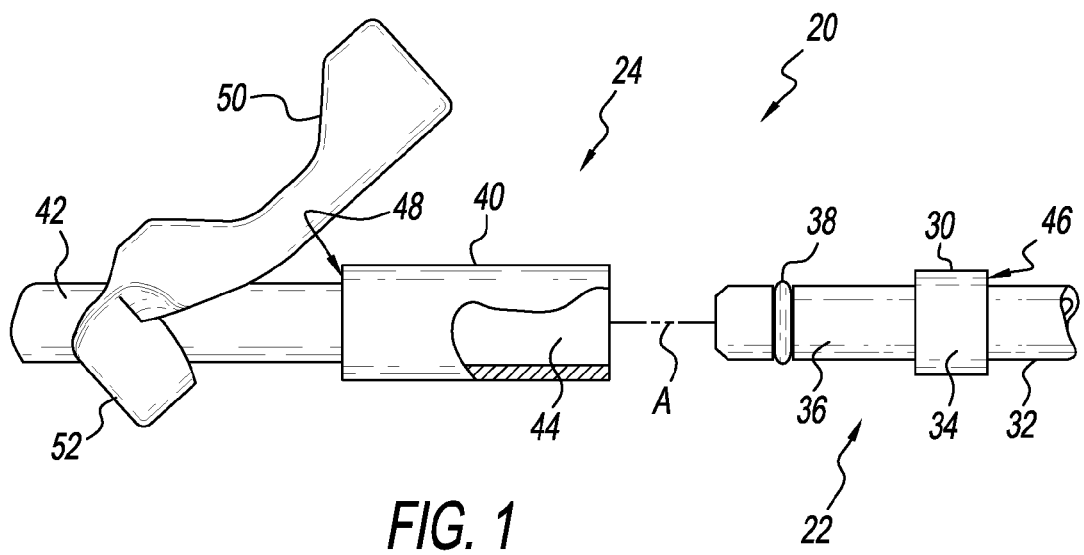
FIG. 1 is a side elevational and partial cut-away view of a tube connection assembly of the present disclosure showing the male and female fittings separately and the fastener on the tube of the female fitting.
Figure 2:
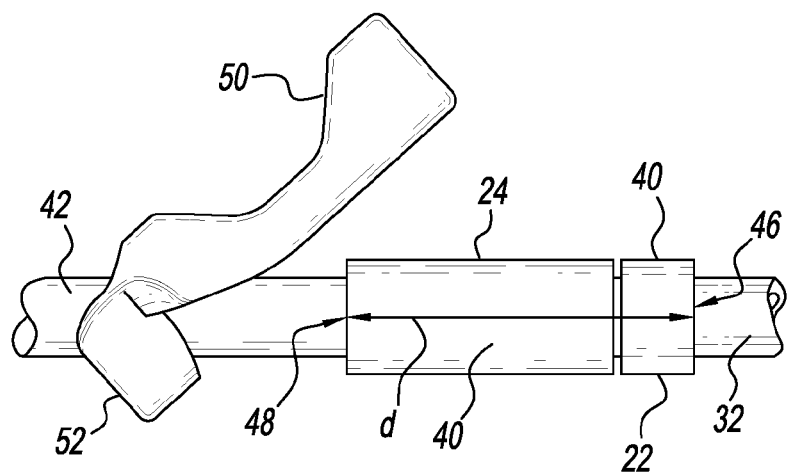
FIG. 2 is a side elevational view of the tube connection assembly of FIG. 1 showing the male and female fittings in engagement and unfastened.
Figure 3:
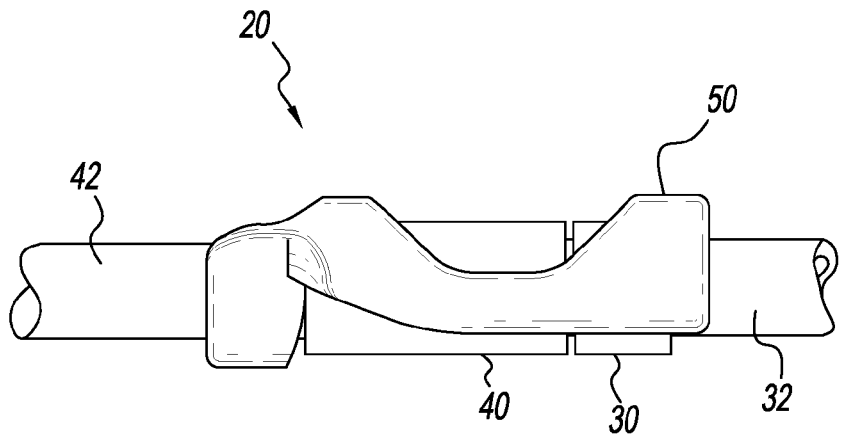
FIG. 3 is a side elevational view of the tube connection assembly of FIG. 1 showing the male and female fittings in engagement and fastened together.
Figure 4:
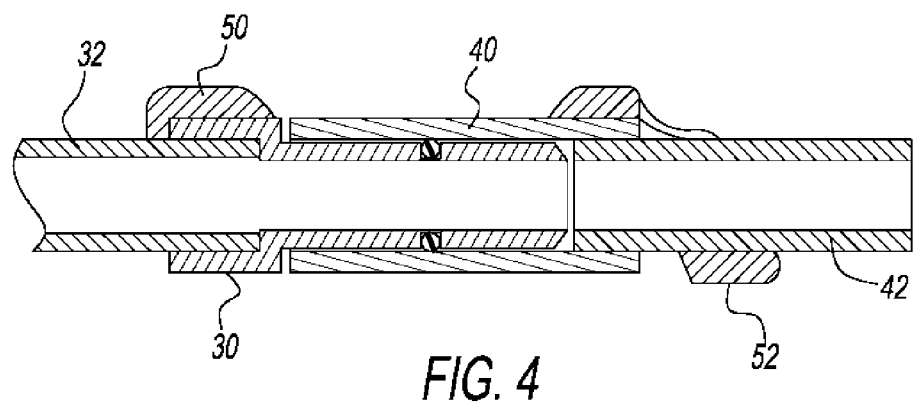
FIG. 4 is a cross-sectional view through the tube connection of FIG. 3.

Referring now to FIGS. 1-3, a tube connection assembly 20 includes a first connector 22 being either a male fitting 30 or a corresponding female fitting 40, and a second connector 24 being the other of the male fitting or the female fitting. The first connector 22 and the second connector 24 are engagable together joining the first and second connectors in a coupled state. In the embodiment shown in FIGS. 1-3, the first connector 22 is the male fitting 30, for example a polymeric fitting overmolded onto a first tube 32. The second connector 24 shown in FIGS. 1-3 is the female fitting 40, for example a polymeric fitting overmolded onto a second tube 42. As shown in FIGS. 1-3, a fastener 50 is positionable in a locked state and an unlocked state. The fastener 50 in the locked state connects the female fitting 40 to the male fitting 30 when the male fitting 30 is positioned within the female fitting 40 in the coupled state.

The male fitting 30 includes a cylindrical body 34 and a tubular sealing element 36 extending longitudinally therefrom positionable within the female fitting 40. In the example shown in FIG. 1, the tubular sealing element 36 is an elongated cylindrical element, optionally terminating at a beveled tip at an end of the male fitting. Alternatively, the tubular sealing element 36 may be a tapered element. The female fitting 40 has a longitudinal cylindrical cavity 44 corresponding to the tubular sealing element 36.

The tube connection assembly 20 includes one or more o-rings 38 sealingly engaging the tubular sealing element 36 and the cylindrical cavity 44. In the example shown in FIG. 1, the o-rings 38 are installed on the tubular sealing element 36. Other embodiments may include the o-rings retained inside of the cylindrical cavity 44. In either configuration, the o-ring 38 has an outside diameter corresponding to the inside diameter of the cylindrical cavity 44 in sealing engagement, and the o-ring 38 has an inside diameter corresponding to the outside diameter of the tubular sealing element 36 in sealing engagement. When the male fitting 30 is positioned within the female fitting 40, the o-ring 38 is sealingly positioned between an inside diameter of the cylindrical cavity 44 of the female fitting and an outside diameter of the tubular sealing element 36 of the male fitting in sealing engagement.

The first connector 22 extends along a connection axis, identified as axis "A" in FIG. 1. The first connector 22 includes a first engagement surface 46 transverse to the connection axis A. The second connector 24 also extends along the connection axis and has a second engagement surface 48 transverse to the connection axis A. The first engagement surface 46 and second engagement surface 48 are spaced apart a predetermined distance, shown as distance "d" in FIG. 2, when the connectors are in the coupled state.

Figure 5:
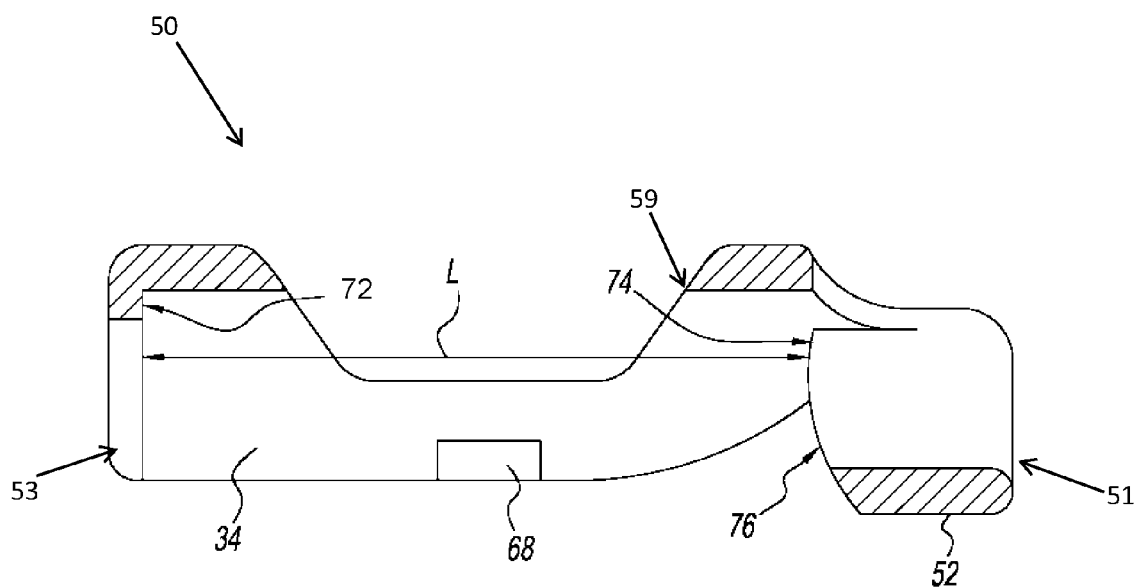
FIG. 5 is a cross-sectional view through the fastener of the present tube connection.

As discussed above, the fastener 50 is positionable in an unlocked state such as shown in FIGS. 1 and 2, and a locked state such as shown in FIG. 3. When the fastener is in the locked state, the fastener holds the first connector and second connector in the coupled state. As shown in FIG. 5, the fastener 50 includes a first retaining surface 72 and a second retaining surface 74, the first and second retaining surfaces 72, 74 opposing each other and spaced apart a distance L, the distance L being the same as or greater the predetermined distance d. When the fastener is in the locked state, the first retaining surface 72 is positioned contacting or adjacent the first engagement surface 46 and the second retaining surface 74 is positioned contacting or adjacent the second engagement surface 48. The first and second retaining surfaces 72, 74 are positioned to prevent the first engagement surface 46 and the second engagement surface 48 from moving away from one another. The first and second retaining surfaces 72, 74 may be spaced apart the same dimension as the distance d between the first and second engagement surfaces 46, 48. Alternatively, the first and second retaining surfaces 72, 74 may be spaced apart a distance greater than the distance d between the first and second engagement surfaces 46, 48 enabling the first connector 22 and the second connector 24 to move relative to one another a small amount when in the coupled state. In certain applications, the distance L between the first and second retaining surfaces 72, 74 is less than the distance d when the fastener is in the unlocked state. In this embodiment, the fastener is made from a resilient material so that the fastener can stretch when being moved to the locked state, elongating until the distance L is the same as distance d providing a gripping force against the engagement surfaces 46, 48.

Figure 6:
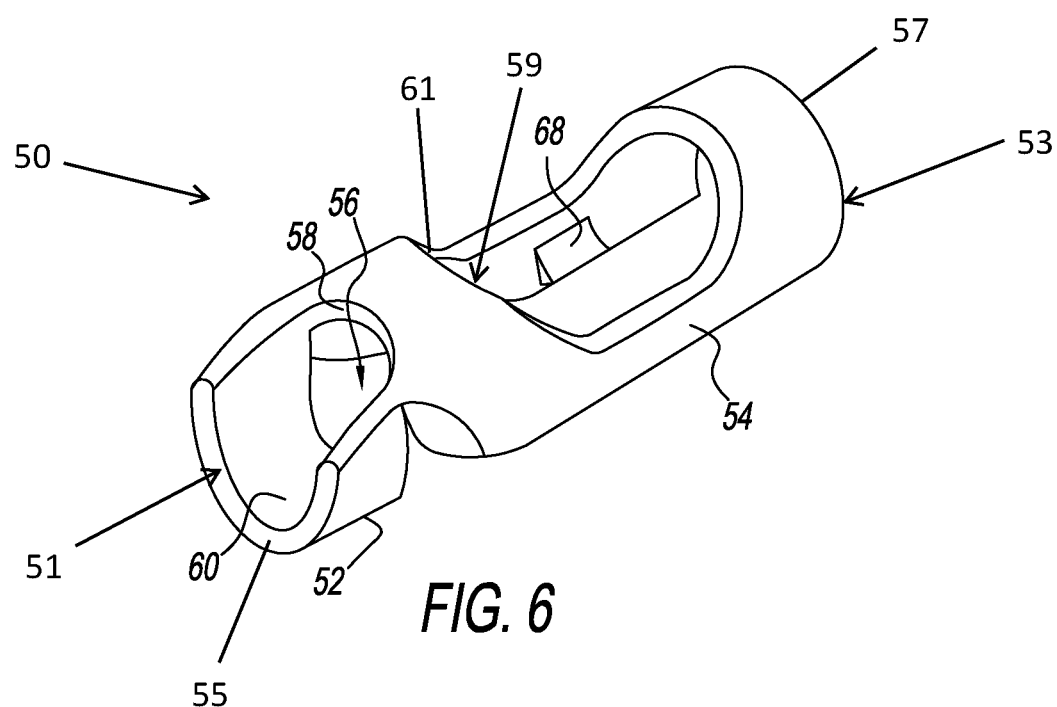
FIG. 6 is a perspective view of the fastener of FIG. 5.
Figure 7:
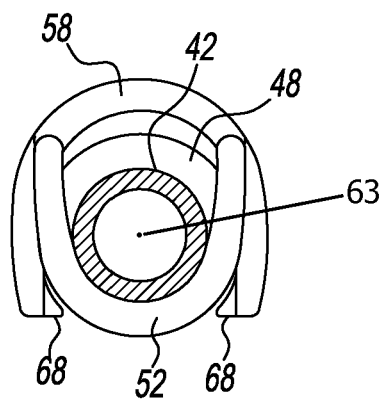
FIG. 7 is a cross-sectional view through a tube of the tube connection assembly showing an end view of the fastener of FIG. 6 in the locked state.

As shown in an embodiment in FIGS. 5-7, the fastener 50 includes a first end 51 and a second end 53, the second end 53 being distal from the first end 51. The first end 51 is a first u-shape 55, and the second end 53 is a second u-shape 57. The second u-shape 57 is substantially inverted from the first u-shape 55 as seen in FIGS. 6 and 7. An intermediate section 59 is located between the first end 51 and the second end 53. The intermediate section 59 is a third u-shape 61. The third u-shape 61 of the intermediate section 59 is substantially inverted from the first u-shape 55 of the first end 51. The fastener includes a longitudinal axis 63 as shown in FIG. 7. The first u-shape 55 extends around the longitudinal axis 63. The second u-shape 57 extends around the longitudinal axis 63 and is axially in line with the first u-shape 55. The third u-shape 61 extends around the longitudinal axis 63 and is axially in line with the first u-shape 55 and the second u-shape 57. The intermediate section 59 is longitudinally separate and distinct from the second u-shape 57. In the embodiment shown in FIG. 5, the second retaining surface includes a lead-in surface 76. The lead-in surface 76 may include an arcuate surface as shown in FIG. 5, or may be a chamfered surface, angled surface, or other lead-in surface as desired for the application.

When the fastener 50 is in the unlocked state, the fastener is slidable along a tube. The fastener 50 includes a tube engagement portion 52 and a body portion 54, the tube engagement portion 52 and the body portion 54 being substantially on opposite sides of a reference plane along the longitudinal center of the tube. The body portion has a tube aperture 56 through the body portion positioned to cooperate with the tube engagement portion 52 to hold the fastener 50 on a tube. As shown in FIG. 6, the tube engagement portion 52 and the edge 58 of the tube aperture 56 provide a passageway for a tube to pass through and retain the fastener 50 on the tube. In the embodiment shown in FIGS. 6 and 7, the tube engagement portion 52 is extending around at least a portion of the tube. In this embodiment, the tube engagement portion 52 includes a semiannular portion 60 extending around one longitudinal half of the tube, and the body portion 54 extending around the opposite longitudinal half of the tube such that the edge 58 of the tube aperture 56 and the tube engagement portion 52 together encircle the tube in a closed loop. The fastener 50 is installed onto a tube by sliding the fastener 50 over an end of the tube so that the tube passes through the closed loop formed by the tube aperture 56 and tube engagement portion 52, locking the fastener onto the tube until slid off a tube end.

Referring now to FIGS. 5-7, the body portion 54 includes a protrusion 68 on one or both sides of the body 34 positioned to engage the female fitting or the male fitting, or both, when the fastener is in the locked state. The protrusions 68 reduce the width of the opening through which the male and female fittings pass to engage the fastener in the locked state. The body portion 54 is resilient enough to temporarily expand for the protrusions 68 to pass over the diameter of the male and female fittings. The body portion 54 and the protrusions 68 are sized and positioned to wrap around a portion of the male and female fittings to inhibit accidental un-locking of the fastener.

Figure 11:
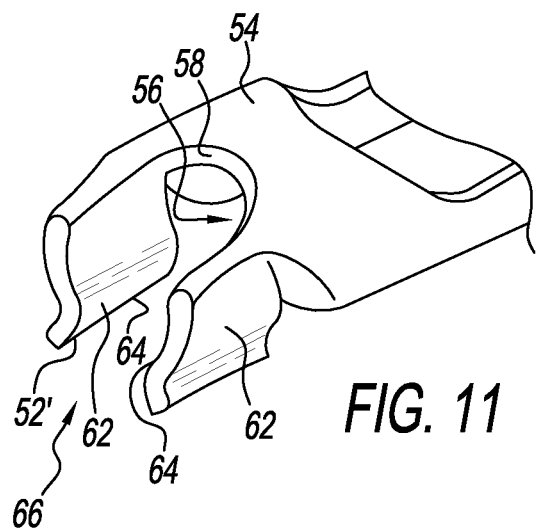
FIG. 11 is a perspective view of an alternative fastener of the present tube connection assembly.
Figure 12:
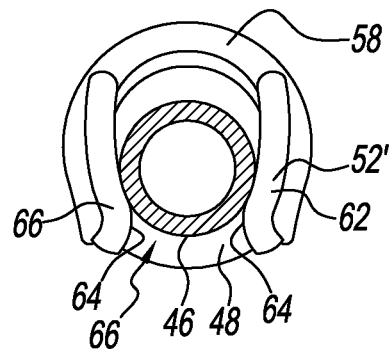
FIG. 12 is a cross-sectional view through a tube of the tube connection assembly showing an end view of the fastener of FIG. 11 in the locked state.

Alternatively, a tube engagement portion 52' may be provided so that the tube engagement portion 52' and the edge 58 of the tube aperture 56 only partially encircle the tube, for example as shown by the embodiment of FIGS. 11 and 12. In the embodiment of FIGS. 11 and 12, the tube engagement portion 52' includes a pair of resilient tab members 62, each positioned along opposite sides of the tube, a lower portion 64 of each tab member 62 positioned a predetermined distance apart providing an opening 66 therebetween. The predetermined distance spanning the opening 66 is less than the diameter of the tube to retain the tube in the tube engagement portion 52'. The resilient tab members 62 are adapted to flex when a tube is pressed into the opening 66 enabling the tube to pass through the opening, after which the resilient tab members return to their original shape to retain the tube in the tube engagement portion 52'. In this way, the fastener of this embodiment may be snapped onto the tube whether or not a tube end is accessible, such as after the tube is installed in its application.

Figure 8:
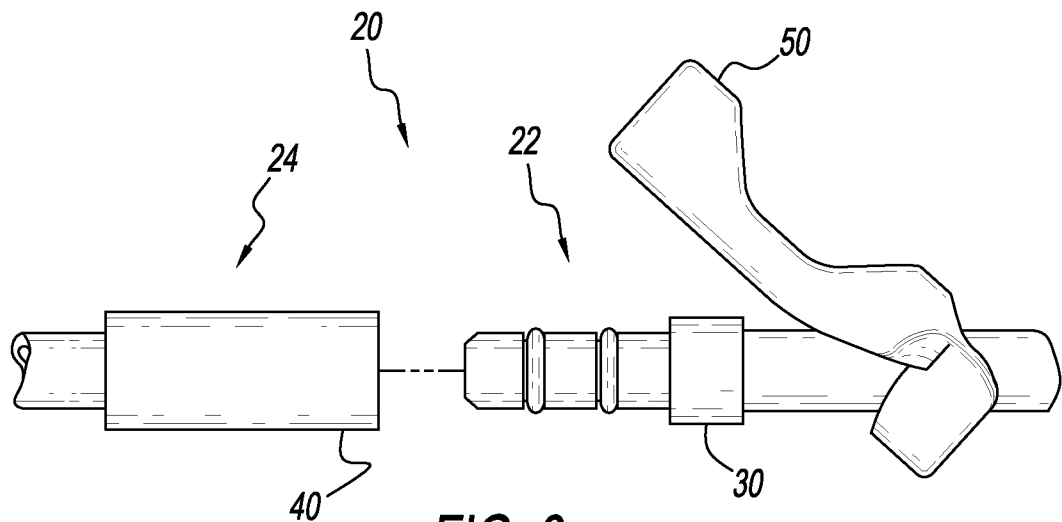
FIG. 8 is a side elevational view of the tube connection assembly of the present disclosure showing the male and female fittings separately and the fastener on the tube of the male fitting.
Figure 9:
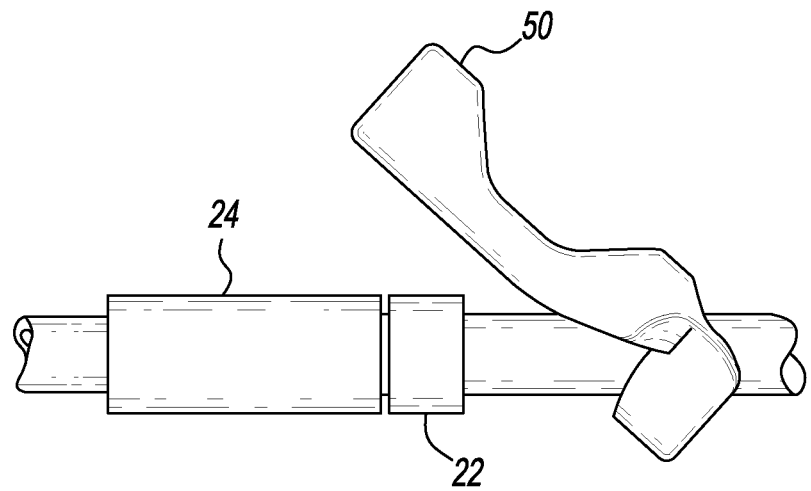
FIG. 9 is a side elevational view of the tube connection assembly of FIG. 8 showing the male and female fittings in engagement and unfastened.
Figure 10:
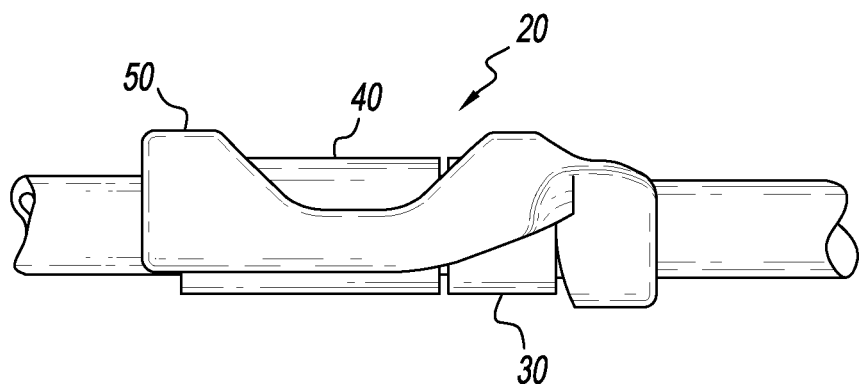
FIG. 10 is a side elevational view of the tube connection assembly of FIG. 8 showing the male and female fittings in engagement and fastened together.

The fastener 50 is adapted to engage a tube connected to the first connector 22 or the second connector 24. As shown in FIGS. 1-3, the fastener 50 is provided with tube 42 connected to the second connector 24. For certain applications, the fastener is provided with the tube 32 connected to the first connector 22 such as shown in FIGS. 8-10. In either case, the fastener in the locked state retains the first engagement surface 46 and the second engagement surface 48 to hold the first and second connectors in the coupled state. Whether the fastener engages the tube with the first connector or second connector may be optional for certain applications. For other applications, limitations on space or access may dictate which side the fastener is positioned. In certain applications, only one of the connectors is connected to a tube facilitating assembly with the fastener, with the other connector attached to a component or other connection.

In the embodiments shown in the figures, the male fitting 30 is affixed to the first tube 32 and the female fitting 40 affixed to the second tube 42 by injection overmolding. In overmolded embodiments of the present invention, the composition of the fitting polymer and the composition of the tube polymer are preferably such that the polymers are capable of at least some melt fusion at contacting interfaces between the tube and the overmolded fitting to increase the leak-proof characteristics of the interface between the tube and the overmolded fitting. This interfacial bonding may extend along the entire length of the physical contacting surfaces between the tube and the overmolded fitting. However, it is recognized that in some applications, the bonding need only occur along a portion of these regions, and for certain applications, bonding may occur between the tube and overmolded fitting without melt fusion occurring between the tube and overmold polymers.

Melt fusion occurs between polymer compositions of the plastic conduit and the overmolded polymer when at least a portion of the adjoining polymers are miscible during injection overmolding. There are several ways by which bonding by melt fusion is effected. Melt fusion is typically facilitated when at least a component of the polymer of the tube and the overmolded polymer is the same. Alternatively, at least a portion of the polymer composition of the tube and the composition of the overmolded polymer is sufficiently similar or compatible so as to permit the melt fusion or blending or alloying to occur at least in the interfacial region between the exterior of the tube and the interior region of the overmolded fitting.

The first tube 32 and the second tube 42 are polymeric tubes typically formed by extrusion. It is contemplated that one or both of the tubes 32, 42 may be injection molded for certain applications in which the tube length and shape is suited for injection molding.

In one application of this invention, the female fitting 40, the male fitting 30, the first tube 32, and the second tube 42 are made from high density polyethylene that is crosslinked (PEX). PEX contains crosslinked bonds in the polymer structure changing the thermoplastic into a thermoset. Crosslinking may be accomplished during or after the molding of the part. The required degree of crosslinking for crosslinked polyethylene tubing, according to ASTM Standard F 876-93 is between 65-89%. There are three classifications of PEX, referred to as PEX-A, PEX-B, and PEX-C. PEX-A is made by the peroxide (Engel) method. In this method, peroxides blended with the polymer performs crosslinking above the crystal melting temperature. The polymer is typically kept at an elevated temperature and pressure for long periods of time during the extrusion process to form PEX-A. PEX-B is formed by the silane method, also referred to as the "moisture cure" method. In this method, silane compounds blended with the polymer induces crosslinking during molding and during secondary post-extrusion processes, producing cross-links between a crosslinking agent. The process is accelerated with heat and moisture. The crosslinked bonds are formed through silanol condensation between two grafted vinyltrimethoxysilane units. PEX-C is produced by application of radiation, such as by an electron beam using high energy electrons to split the carbon-hydrogen bonds and facilitate crosslinking.

The female fitting 40, the male fitting 30, the first tube 32, and the second tube 42, may be polyethylene or crosslinked polyethylene (PEX) as discussed above, but may also be made from various other polymers as desired for the application. In the practice of this invention, illustrative and non-limiting examples of the polymers that may be used in various combinations to form the first tube 32, the second tube 42, the male fitting 30, and the female fitting 40, include: polyacetals, nylons or polyamides, including various types of nylon-6, nylon-6/6, nylon-6/9, nylon-6/10, nylon-6/12, nylon-11, nylon-12, acrylonitrile butadiene styrene terpolymers, polystyrenes, polycarbonates, polyvinyl chlorides and chlorinated polyvinyl chlorides, polyethylene terephthalate polyester, polyethylene homopolymers and copolymers, including all molecular weight and density ranges and degrees of crosslinking and raised-temperature polymers, polypropylene homopolymers and copolymers, polybutene resins, poly(meth)acrylics, polyalkylene terephthalates, polyetherimides, polyimides, polyamide-imides, polyacrylates of aromatic polyesters, polyarylether ketones, polyacrylonitrile resins, polyphenylene oxides including polystyrene miscible blends, polyphenylene sulfides, styrene-acrylonitrile copolymers, styrene-butadiene copolymers, styrene maleic anhydride copolymers, polyarylsulfones, polyethersulfones, polysulfones, ethylene acid copolymers, ethylene-vinyl acetate copolymers, ethylene-vinyl alcohol copolymers, thermoplastic elastomers covering a hardness range of from 30 Shore A to 75 Shore D, including styrenic block copolymers, polyolefin blends (TPO), elastomeric alloys, thermoplastic polyurethanes (TPU), thermoplastic copolyesters, and thermoplastic polyamides, polyvinylidene chlorides, allyl thermosets, bismaleimides, epoxy resins, phenolic resins, unsaturated thermoset polyesters, thermoset polyimides, thermoset polyurethanes, and urea and melamine formaldehyde resins. Other polymeric materials may be selected as suitable for a desired application.

In a preferred embodiment, the polymers for the polymeric male fitting and the polymeric female fitting will be high density polyethylene, which is subsequently crosslinked, preferably by the application of an electron beam, although other modes of crosslinking are envisioned to be within the scope of this invention. In an alternative embodiment, the polymers for the polymeric male fitting and the polymeric female fitting will be glass-filled high density polyethylene, which is subsequently crosslinked by application of an electron beam. The first tube 32 and the second tube 42 may also be crosslinked high density polyethylene.

The fastener 50 is made from a rigid or semi-rigid polymeric material, and for certain applications could be made from a polymeric material selected from the list of materials above discussed with reference to the male and female fittings, such as crosslinked glass-filled high density polyethylene. In other applications the fastener 50 may require polymers such as polyacetal, nylon or polyamide, acrylonitrile butadiene styrene terpolymer, polystyrene, polycarbonate, polyvinyl chloride, polyethylene terephthalate polyester, or other polymeric materials as desired for the application suitable for retaining the male fitting 30 in the cylindrical cavity 44 under the loading and environmental conditions of the application. In one example, the fastener is glass-filled nylon.

In one alternative, the male fitting or the female fitting or both are not overmolded onto the tube, instead are connected to the tube by way of a hose barb or other connection. When the male fitting or female fitting is not overmolded, in addition to the selection of materials identified above, the male fitting or the female fitting may be made of brass, copper, stainless steel, or other metal as desired.

The o-ring 38 is made from an elastomeric material such as, for example, ethylene-propylene copolymer (EPDM), nitrile or buna-N, silicone, rubber, or thermoplastic elastomer as desired for the application suitable for sealing the tubular sealing element 36 in the cylindrical cavity 44. In one exemplary embodiment, the o-ring 38 is nitrile.

Figure 13:
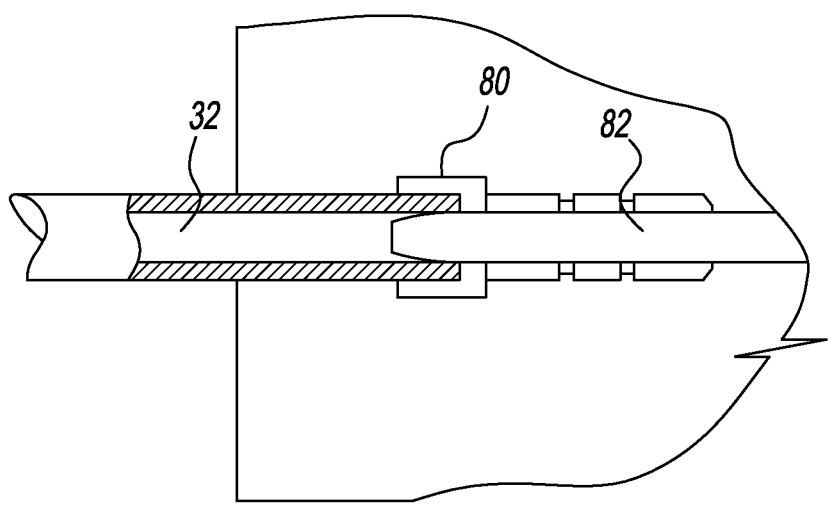
FIG. 13 is a partial view of a mold cavity of one half of the injection mold for forming a male fitting of the present disclosure.

In one exemplary embodiment, a process for providing a tube connection assembly includes positioning an end of the first tube 32 into a first mold cavity 80 having a desired shape and positioning a core pin 82 at least partially into the end of the first tube as shown, for example, in FIG. 13, the mold cavity co-acting with the core pin and the tube to define an overmolding shape for the male fitting 30. Then, injection overmolding a first polymeric material into the first mold cavity 80 over a portion of the tube end and core pin 82 forming the male fitting 30 having the cylindrical body 34 and a tubular sealing element 36 extending longitudinally therefrom positionable within the polymeric female fitting 40, described and shown with reference to FIG. 1. The exemplary process includes positioning an end of the second tube into a second mold cavity, not shown, having a desired shape and positioning a core pin at least partially into the end of the second tube, and injection overmolding a second polymeric material into the second mold cavity over a portion of the tube end and core pin forming the female fitting 40 having a longitudinal cylindrical cavity 44, described with reference to FIG. 1. All or a portion of the overmolded tubes may be crosslinked.

The process further includes sliding the fastener 50 over the end of either the first tube or second tube prior to overmolding the fitting. Alternatively, the fastener 50 may be placed over the distal end of the tube after the fitting is overmolded onto the proximal end. In yet another alternative, the fastener 50 of the embodiment such as shown in FIGS. 11 and 12 may be snapped over the tube adjacent either the male fitting or the female fitting as desired.

One or more o-rings 38 are provided on the tubular sealing element 36 of the male fitting, or in the cylindrical cavity 44 of the female fitting, as desired, the o-ring 38 sized for sealing engagement between the tubular sealing element and the cylindrical cavity.

The process of making a connection includes connecting the female fitting to the male fitting and retaining the female fitting to the male fitting by positioning the fastener 50 in its locked state retaining the first engagement surface 46 and the second engagement surface 48 of the fittings 30, 40.

An exemplary process for securing a fluid component to another fluid component, the process may include installing a polymeric first connector in fluid communication with a first component, and a polymeric second connector in fluid communication with a second component, where either the first component is a first tube or the second component is a second tube, or both are tubes. The first connector is either a male fitting or a female fitting, and the other of the male fitting or the female fitting being the second connector. As discussed above, the female fitting has a longitudinal cylindrical cavity and the male fitting has a cylindrical body and a tubular sealing element extending longitudinally therefrom positionable within the polymeric female fitting with an o-ring in sealing engagement therebetween. A fastener engages either the first tube or the second tube connected to the first or second connector as desired, the fastener moving between a locked state connecting the female fitting to the male fitting when the male fitting is positioned within the female fitting and an unlocked state in which the male fitting is removable from the female fitting and the fastener is slidable along the tube. The process includes positioning the male fitting within the female fitting in sealing engagement, and connecting the female fitting to the male fitting by fastening the fastener in its locked state connecting the female fitting to the male fitting.

In another example, such as securing a water source to a household appliance, such as a refrigerator, dishwasher, humidifier, ice maker, or any other appliance, a process for securing one fluid component to another fluid component may include installing a first tube having a polymeric male fitting overmolded onto a first tube in fluid communication with a first component, the male fitting having a cylindrical body and a tubular sealing element extending longitudinally therefrom positionable within a crosslinked polymeric female fitting overmolded onto a second tube. Then, installing the second tube with the crosslinked polymeric female fitting in fluid communication with a second component, the female fitting having a longitudinal cylindrical cavity. A fastener engages either the first tube or the second tube connected to the first or second connector as desired, the fastener moving between a locked state connecting the female fitting to the male fitting when the male fitting is positioned within the female fitting and an unlocked state in which the male fitting is removable from the female fitting and the fastener is slidable along the tube. The process may include positioning the male fitting within the female fitting, an o-ring positioned therebetween in sealing engagement, and connecting the female fitting to the male fitting by fastening a fastener in its locked state connecting the female fitting to the male fitting.

While the invention has been illustrated and described in detail in the drawings and foregoing description, the same is to be considered as illustrative and not restrictive in character, it being understood that only preferred embodiments have been shown and described and that all changes and modifications that come within the spirit of the invention are desired to be protected by the appended claims and the equivalents thereof.

What is claimed is:

1. A tube connection assembly comprising:
   a first connector along a connection axis having a first engagement surface transverse to the connection axis, and
   a second connector connected to a tube, the second connector having a second engagement surface transverse to the connection axis,
   the first connector and the second connector being engagable together joining the first and second connectors in a coupled state, the first engagement surface and the second engagement surface spaced a predetermined distance when in the coupled state,
   a monolithic fastener positionable in a locked state and an unlocked state, the fastener in the unlocked state being slidable along the tube, and the fastener in the locked state retaining the first engagement surface and the second engagement surface, the fastener comprising:
      a longitudinal axis;
      a first end being a first u-shape extending around the longitudinal axis,
      a second end distal from the first end, the second end being a second u-shape, the second u-shape being substantially inverted from the first u-shape of the first end, the second u-shape extending around the longitudinal axis and being axially in line with the first u-shape, and
      an intermediate section between the first end and the second end, the intermediate section being a third u-shape, the third u-shape extending around the longitudinal axis and being axially in line with the first u-shape and the second u-shape, wherein the third u-shape of the intermediate section is substantially inverted from the first u-shape of the first end, and the intermediate section being longitudinally separate and distinct from the second u-shape.

2. The tube connection assembly according to claim 1, the fastener having
   a tube engagement portion and
   a pair of opposing retaining surfaces spaced at least the predetermined distance.

3. The tube connection assembly according to claim 2, one of the opposing retaining surfaces including a lead-in surface.

4. The tube connection assembly according to claim 3, the lead-in surface including an arcuate surface.

5. The tube connection assembly according to claim 2, the tube engagement portion extending around at least a portion of the tube.

6. The tube connection assembly according to claim 2, the fastener including a body portion having a pair of opposing retaining protrusions, the body portion being substantially inverted from the tube engagement portion.

7. The tube connection assembly according to claim 1, the second connector is overmolded onto the tube.

8. The tube connection assembly according to claim 1, the first connector is overmolded onto a second tube.

9. The tube connection assembly according to claim 1, one of the first connector and the second connector being a male connector and the other being a corresponding female connector.

10. A tube connection assembly comprising:
    a first connector along a connection axis having a first engagement surface transverse to the connection axis, and
    a second connector connected to a tube, the second connector having a second engagement surface transverse to the connection axis,
    the first connector and the second connector being engagable together joining the first and second connectors, the first engagement surface and the second engagement surface spaced a predetermined distance when in the coupled state,
    a monolithic fastener positionable in a locked state and an unlocked state, the fastener comprising:
       a longitudinal axis,
       a first end being a first u-shape extending around the longitudinal axis,
       a second end distal from the first end, the second end being a second u-shape, the second u-shape being substantially inverted from the first u-shape of the first end, the second u-shape extending around the longitudinal axis and being axially in line with the first u-shape, and
       an intermediate section between the first end and the second end, the intermediate section being a third u-shape, the third u-shape extending around the longitudinal axis and being axially in line with the first u-shape and the second u-shape, wherein the third u-shape of the intermediate section is substantially inverted from the first u-shape of the first end, and the intermediate section being longitudinally separate and distinct from the second u-shape,
    the fastener having a pair of opposing retaining surfaces spaced at least the predetermined distance, at least one of the retaining surfaces including a lead-in surface, the fastener in the locked state retaining the first engagement surface and the second engagement surface.

11. The tube connection assembly according to claim 10, the fastener having a tube engagement portion.

12. The tube connection assembly according to claim 11, the tube engagement portion encircling at least a portion of the tube.

13. The tube connection assembly according to claim 11, a body portion comprising a pair of opposing retaining protrusions, the body portion being substantially inverted from the tube engagement portion.

14. The tube connection assembly according to claim 10, the lead-in surface including an arcuate surface.

15. The tube connection assembly according to claim 10, the second connector is overmolded onto the tube.

16. The tube connection assembly according to claim 10, the first connector is overmolded onto a second tube.

17. The tube connection assembly according to claim 10, one of the first connector and the second connector being a male connector and the other being a corresponding female connector.

18. A fastener for use with a tube connection assembly, the tube connection assembly having a first connector and a second connector connected to a tube, the fastener comprising:
    a longitudinal axis, a first end being a first u-shape extending around the longitudinal axis, a second end distal from the first end, the second end being a second u-shape, the second u-shape being substantially inverted from the first u-shape of the first end, the second u-shape extending around the longitudinal axis and being axially in line with the first u-shape, and an intermediate section between the first end and the second end, the intermediate section being a third u-shape, the third u-shape extending around the longitudinal axis and being axially in line with the first u-shape and the second u-shape, wherein the third u-shape of the intermediate section is substantially inverted from the first u-shape of the first end, and the intermediate section being longitudinally separate and distinct from the second u-shape, wherein the fastener is monolithic.

19. The tube connection assembly according to claim 18, the fastener further comprising:

a tube engagement portion, a body portion, and a pair of opposing retaining surfaces, at least one of the retaining surfaces including a lead-in surface, the body portion being substantially inverted from the tube engagement portion.

20. The tube connection assembly according to claim 19, the tube engagement portion extending around at least a portion of the tube, the lead-in surface including an arcuate surface.

\* \* \* \* \*